(12) United States Patent
Anikhindi et al.

(10) Patent No.: US 8,739,522 B2
(45) Date of Patent: Jun. 3, 2014

(54) SYSTEMS AND METHODS FOR PRE-HEATING COMPRESSED AIR IN ADVANCED ADIABATIC COMPRESSED AIR ENERGY STORAGE SYSTEMS

(75) Inventors: Sanjay Anikhindi, Karnataka (IN); Bhaskara Kosamana, Karnataka (IN)

(73) Assignee: Nuovo Pignone S.p.A., Florence (IT)

( * ) Notice: Subject to any disclaimer, the term of this patent is extended or adjusted under 35 U.S.C. 154(b) by 714 days.

(21) Appl. No.: 12/915,414

(22) Filed: Oct. 29, 2010

(65) Prior Publication Data

US 2012/0102937 A1 May 3, 2012

(51) Int. Cl.
*F01K 3/00* (2006.01)

(52) U.S. Cl.
USPC .......... 60/327; 60/456; 60/409; 60/413; 60/659

(58) Field of Classification Search
USPC ........... 60/327, 398, 456, 409, 413, 659, 650, 60/682, 684
See application file for complete search history.

(56) References Cited

U.S. PATENT DOCUMENTS

| | | | |
|---|---|---|---|
| 2,690,656 A | 10/1954 | Cummings | |
| 4,275,310 A * | 6/1981 | Summers et al. | 290/1 R |
| 4,329,851 A | 5/1982 | Bourne | |
| 4,765,142 A * | 8/1988 | Nakhamkin | 60/652 |
| 4,936,109 A | 6/1990 | Longardner | |
| 6,477,852 B2 | 11/2002 | Dodo et al. | |
| 7,243,510 B2 | 7/2007 | Jones et al. | |
| 7,971,449 B2 | 7/2011 | Peterson et al. | |
| 8,341,964 B2 | 1/2013 | Finkenrath et al. | |
| 2010/0251712 A1* | 10/2010 | Nakhamkin | 60/659 |
| 2011/0100010 A1* | 5/2011 | Freund et al. | 60/659 |

* cited by examiner

*Primary Examiner* — Edward Look
*Assistant Examiner* — Logan Kraft
(74) *Attorney, Agent, or Firm* — Global Patent Operation

(57) ABSTRACT

Systems and methods provide for capturing heat energy in a power generation system. The system includes: a first compressor configured to exhaust a first compressed, heated air flow; a heat exchanger connected to the first compressor and configured to receive the first compressed, heated air flow and configured to transfer heat energy from the first compressed, heated air flow to an oil; at least one pump connected to the heat exchanger and configured to pump the heated oil in a closed-loop system from the heat exchanger to an insulated storage tank; a second compressor connected to the heat exchanger and configured to exhaust a second compressed, heated air flow; and an energy storage unit connected to the second compressor and configured to store heat energy from the second compressed, heated air flow.

20 Claims, 11 Drawing Sheets

602

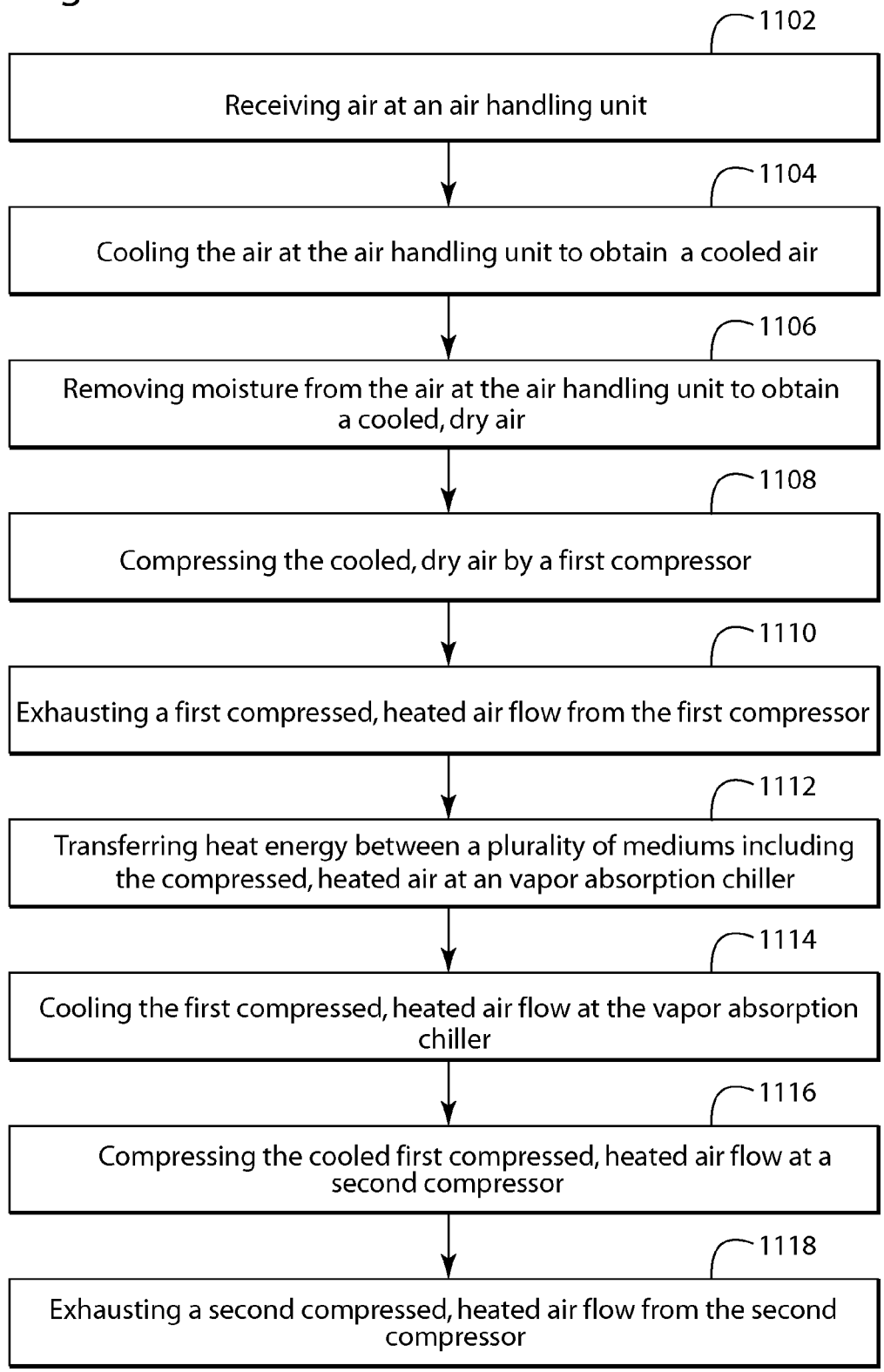

SYSTEMS AND METHODS FOR PRE-HEATING COMPRESSED AIR IN ADVANCED ADIABATIC COMPRESSED AIR ENERGY STORAGE SYSTEMS

TECHNICAL FIELD

The embodiments of the subject matter disclosed herein generally relate to power generation systems and more specifically to advanced adiabatic compressed air energy storage systems.

BACKGROUND

As population increases, the desire for more electrical power is also generally increasing. Demand for this power typically varies during the course of a day with afternoon and early evening hours generally being the time of peak demand with later night and very early morning hours generally being the time of lowest demand for power. However, power generation systems need to meet both the lowest and highest demand systems for efficiently delivering power at the various demand levels.

One system attempts to solve this problem by storing energy generated during off-peak demand hours for use during peak demand hours. This system is called an Advanced Adiabatic Compressed Air Energy Storage (AA-CAES) system and is shown in FIG. 1 as part of a power generation system 2. The power generation system 2 is now generally described by following the path of the air flow. Initially in step 3a, air is taken into an axial compressor 4 and compressed during which the air is put under pressure and undergoes an increase in temperature. This air is exhausted in step 3b, and undergoes cooling at the Intercooler 6 to be cooled to the desired temperature for further compression. The air flow is then entered in step 3c to a first radial compressor 8. The air is then compressed by the first radial compressor 8, exits the first radial compressor 8 and in step 3d enters a second radial compressor 10 for further compression.

The air flow then goes, in step 3e, from the second radial compressor 10 to an energy storage unit, e.g., a Thermal Energy Store 12. The hot compressed air from the second radial compressor 10 is then cooled by the Thermal Energy Store 12. The heat energy is stored in the Thermal Energy Store 12 for future use and any water that is generated by the cooling process is drained off. The cooled compressed air is then sent to a Safety Cooler 14 in step 3f, where the air is further cooled prior to being sent in step 3g to a storage facility, e.g., cavern 16. This storage of the compressed air in the cavern 16 and the storage of the energy in the Thermal Energy Store 12 typically occurs during non-peak demand operation of the power generation system 2.

When the demand for power from the power generation system 2 increases to a desired point, energy output can be increased by releasing the stored compressed air back into the system to drive an expander 18, e.g., a turbine. For example, the cavern 16 releases some of the stored compressed air, in step 3h, to the Thermal Energy Store 12 for heating. Heat energy is transferred from the Thermal Energy Store 12 to the compressed air and the heated compressed air flows to a particle filter 20 in step 3i. The heated compressed air then flows, in step 3j, to an expansion section of turbine 18. During expansion the air cools and undergoes a pressure drop while producing the work which drives the shaft 26 which in turn spins a portion of a generator 30 for power generation. After expansion the air flows from the turbine 18 to an air outlet 22 in step 3k, typically for release to atmosphere. Power generation system 2 can also include a shaft 24 for the compressors, a gear box 28 and a motor 32.

While the system shown in FIG. 1 does allow for storing energy for use during peak demand hours, it can be appreciated that power needs are going to grow and finding ways to meet the growing demand is desirable.

Accordingly, systems and methods for improving efficiency in power generation systems are desirable.

SUMMARY

According to an exemplary embodiment there is a system for capturing heat energy in a power generation system. The system includes: a first compressor configured to exhaust a first compressed, heated air flow; a heat exchanger connected to the first compressor and configured to receive the first compressed, heated air flow and configured to transfer heat energy from the first compressed, heated air flow to an oil; at least one pump connected to the heat exchanger and configured to pump the heated oil in a closed-loop system from the heat exchanger to an insulated storage tank; a second compressor connected to the heat exchanger and configured to exhaust a second compressed, heated air flow; an energy storage unit connected to the second compressor and configured to store heat energy from the second compressed, heated air flow; a storage facility connected to the energy storage unit and configured to store a cooled, compressed air received from the energy storage unit and configured to selectively release the cooled, compressed air back into the power generation system; and an insulated storage tank fluidly connected to the at least on pump configured to store the heated oil and configured to transfer heat energy from the heated oil to the cooled, compressed air.

According to another exemplary embodiment there is a system for capturing heat energy in a power generation system. The system includes: a first compressor configured to exhaust a first compressed, heated air flow; an insulated storage tank connected to the first compressor and configured to store an oil, to receive the first compressed, heated air flow, to transfer heat energy from the first compressed heated air flow to the oil and to transfer heat energy from the oil after being heated to a cooled, compressed air flow; a second compressor connected to the insulated storage tank and configured to exhaust a second compressed, heated air flow; an energy storage unit connected to the second compressor and configured to store heat energy from the second compressed, heated air flow; and a storage facility connected to the energy storage unit and configured to store the cooled, compressed air received from the energy storage unit and configured to selectively release the cooled, compressed air back into the power generation system.

According to another exemplary embodiment there is a method for capturing heat energy in a power generation system. The method includes: exhausting a first compressed, heated air flow from a first compressor; storing an oil in an insulated storage tank; receiving the first compressed heated air flow at the insulated storage tank; transferring heat energy from the first compressed, heated air flow to the oil at the insulated storage tank; transferring heat energy from the oil after being heated, to a cooled, compressed air at the insulated storage tank; exhausting a second compressed, heated air flow by a second compressor; storing heat energy from the second compressed, heated air flow at an energy storage unit; storing the cooled, compressed air received from the energy storage unit at a storage facility; and selectively releasing the cooled, compressed air for use in power generation by the storage facility.

BRIEF DESCRIPTION OF THE DRAWINGS

The accompanying drawings illustrate exemplary embodiments, wherein:

FIG. 11 is a flowchart showing a method for cooling air in a power generation system according to exemplary embodiments.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As described in the Background section, systems and methods for improving efficiency in power generation systems are desirable. Exemplary embodiments described herein provide systems and methods for improving efficiency in power generation systems. According to exemplary embodiments, heat energy typically lost between compressors in a Compressed Air Energy Storage (CAES) system can be recovered for use in a modified adiabatic CAES (AA-CAES) system, an example of which is shown in FIG. 2.

Figure 1:
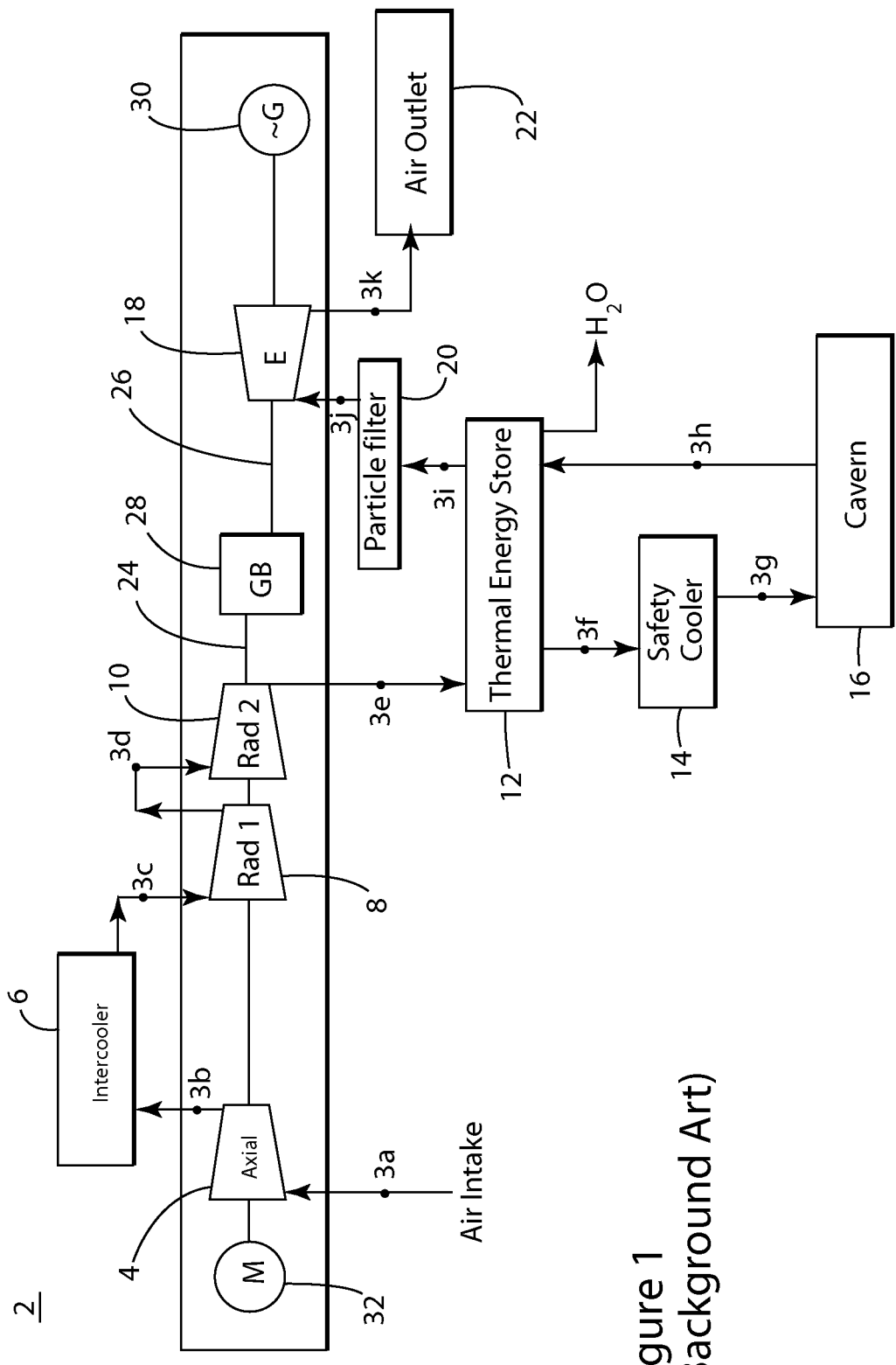
FIG. 1 depicts a power generation system and an Advanced Adiabatic Compressed Air Energy Storage (AA-CAES) system.
Figure 2:
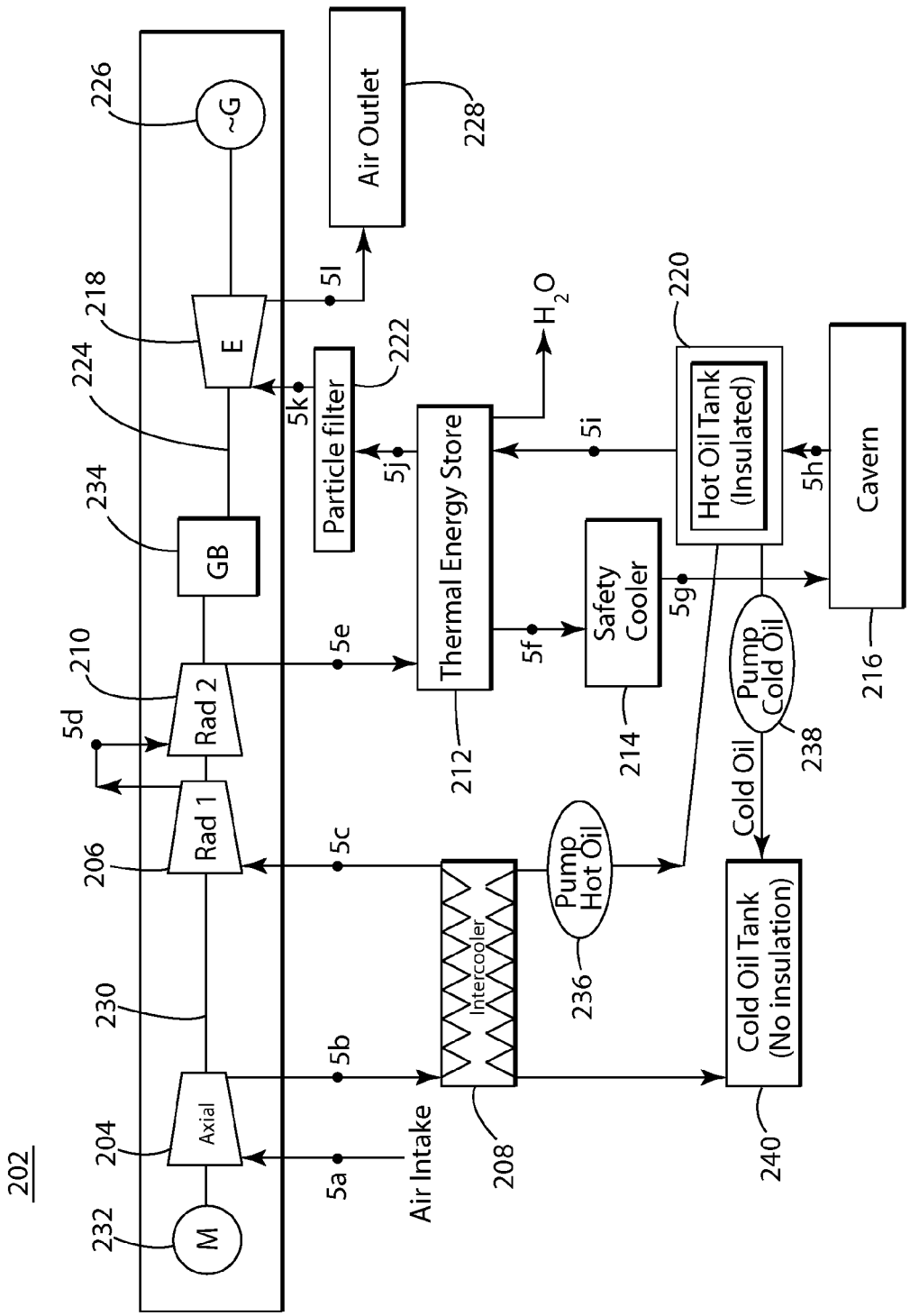
FIG. 2 illustrates a power generation system and an efficient AA-CAES system according to exemplary embodiments.

According to exemplary embodiments, FIG. 2 shows a power generation system 202 which includes a modified AA-CAES system which captures and stores the heat energy, which is typically lost between an axial compressor 204 and a radial compressor 206, for use during peak or near peak load conditions. By capturing this heat energy there can be approximately an 8-10 percent improvement in overall operating efficiency of the power generation system 202 when compared with the system 2 shown in FIG. 1. This system will now be described by generally following the flow of an air in the system starting with air intake to the axial compressor 204. Initially in step 5a, air is taken into an axial compressor 204 and compressed during which the air is put under pressure and undergoes an increase in temperature. This air is exhausted from the axial compressor 204 in step 5b, and undergoes heat exchange in a heat exchanger, e.g., Intercooler 208, with oil which is in its own closed loop system. This heat exchange and the closed loop system for the oil are explained in more detail below. The cooled air flow then enters, in step 5c, the first radial compressor 206. The air is then compressed by the first radial compressor 206, exits the first radial compressor 206 and in step 5d enters a second radial compressor 210 for further compression. It is noted that more or less radial compressors may be used, for example the power generation system 202 can include an axial compressor 204 and a single radial compressor 206.

The air flow then goes in step 5e from the second radial compressor 210 to an energy storage unit, e.g., a Thermal Energy Store 212. The hot compressed air from the second radial compressor 210 is then cooled by the Thermal Energy Store 212. The heat energy is stored in the Thermal Energy Store 212 for future use and any water that is generated by the cooling process is drained off. The cooled compressed air is then sent to a Safety Cooler 214 in step 5f, where the air is further cooled prior to being sent in step 5g to a storage facility, e.g., cavern 216. This storage of the compressed air in the cavern 216 and the storage of the energy in the Thermal Energy Store 212 typically occurs during non-peak demand operation of the power generation system 202.

When the demand on the power generation system 202 increases to a desired point, energy output can be increased by releasing the stored compressed air back into the system to drive an expander 218, e.g., a turbine. For example, the cavern 216 releases some of the stored compressed air in step 5h which undergoes preheating in an insulated hot oil tank 220. The released compressed air then flows to the Thermal Energy Store 212 for heating in step 5i. Heat energy is transferred from the Thermal Energy Store 212 to the compressed air and the heated compressed air flows (optionally) to a particle filter 222 in step 5j. The heated compressed air then flows in step 5k from the particle filter 222 to an expansion section of turbine 218. During expansion the air cools and undergoes a pressure drop while producing the work which drives the shaft 224, which in turn spins a portion of a generator 226 for generating power. After expansion the air flows from the turbine 218 to an air outlet 228 in step 5j, typically for release to atmosphere. The power generation system 202 can also include a shaft 230 for the compressors, a gear box 234 and a motor 232 for driving the compressor 204.

Returning now to the Intercooler 208 and the closed loop oil system, the flow of the oil which supports the heat energy transfer described above will now be described. According to exemplary embodiments, oil is initially heated in the Intercooler 208 by the exhaust air from the axial compressor 204. Other types of compressors may be used in the power generation system 202. This heated oil is transferred from the Intercooler 208 by, e.g., a hot oil pump 236, to the insulated hot oil tank 220. As previously described, heat is transferred from the hot oil to the compressed air when released from the cavern 216. This cooled oil is then pumped by a cold oil pump 238 to a cold oil tank 240 which is typically not insulated. From there the cooled oil is pumped back to the Intercooler 208 to continue the process again. The oil used for this closed loop heat transfer process can have a high specific heat. The oil may be any di-thermic oil, for example, a Dowtherm fluid that has a specific heat of 2.3 kJ/kg-K at substantially 250° C.

Figure 3:
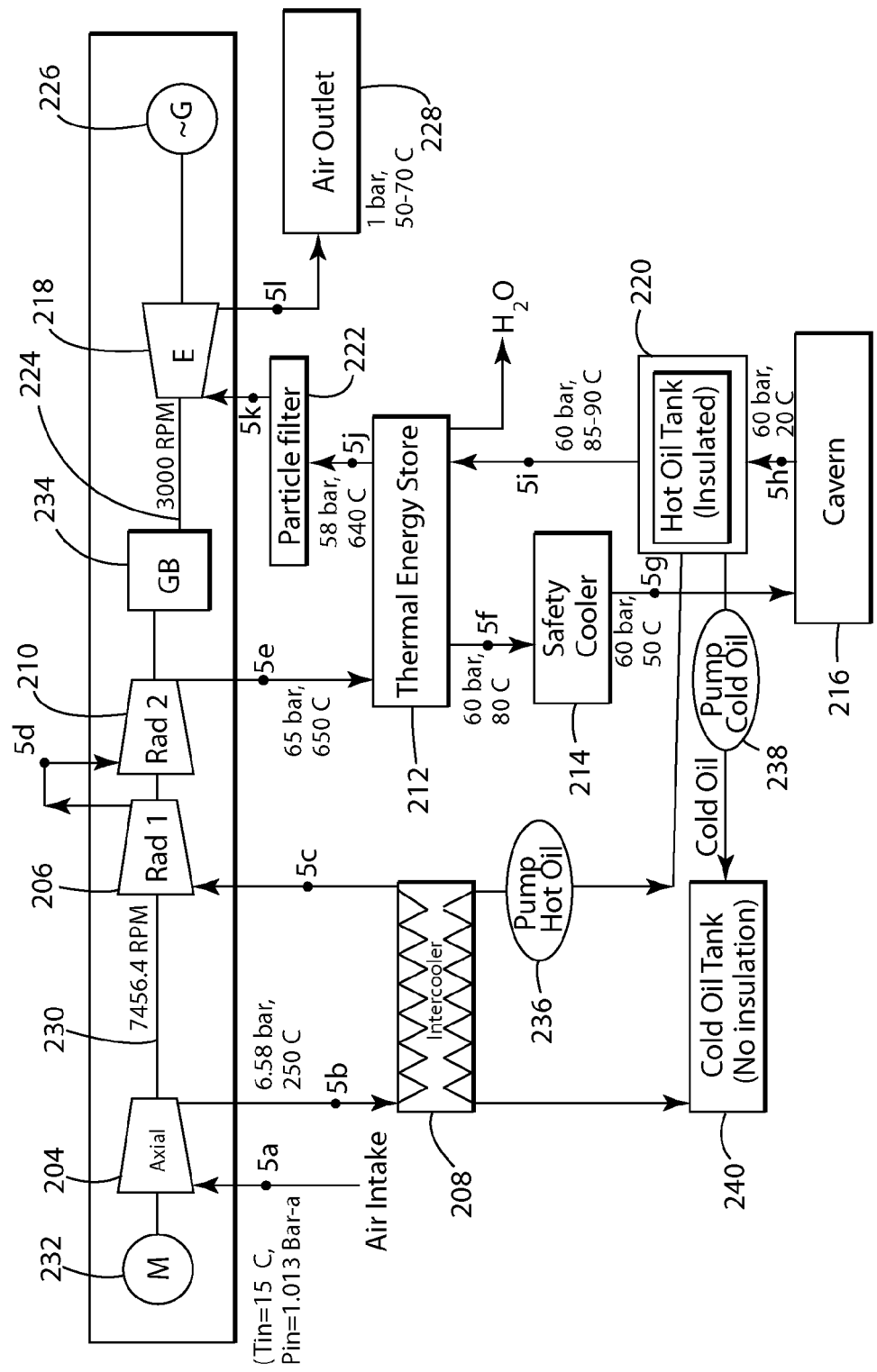
FIG. 3 shows the system of FIG. 2 with illustrative values according to exemplary embodiments.

According to an exemplary embodiment, an illustrative example with values of the pressures and temperatures of the air and oil at various points of the system shown in FIG. 2 is shown in FIG. 3. These values are exemplary and not intended to limit the embodiments. The system in FIG. 3 will operate as described above with respect to the system shown in FIG. 2 thus this description is omitted.

Figure 4:
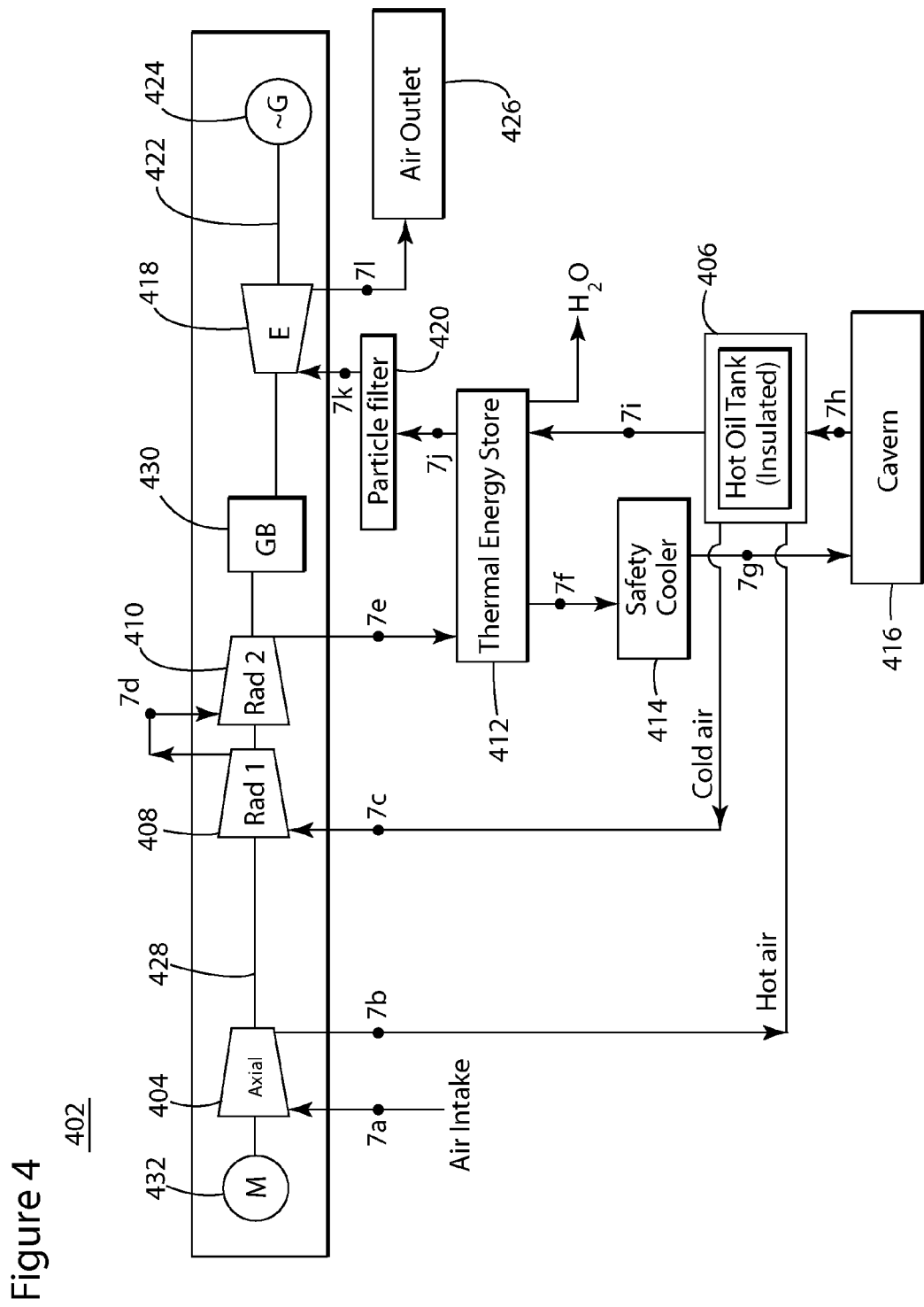
FIG. 4 illustrates a power generation system and an another efficient AA-CAES system according to exemplary embodiments.

According to another exemplary embodiment, heat energy can be captured and stored for future use in a power generation system 402 as shown in FIG. 4. The power generation system 402 includes a modified AA-CAES system which stores the heat energy, which is typically lost between an axial compressor 404 and a radial compressor 408, for use during peak or near peak load conditions. By capturing this heat energy there can be approximately an 8-10 percent improvement in an overall operating efficiency of the power generation system 402. This system will now be described by generally following the flow of air in the system starting with air intake to the axial compressor 404. Initially in step 7a, air is taken into an axial compressor 404 and compressed during which the air is put under pressure and undergoes an increase in temperature. This air is exhausted from the axial compressor 404 in step 7b, and undergoes heat exchange (i.e., heats an oil or another flow of air) with an insulated hot oil tank 406. The cooled air flow then, in step 7c, departs the insulated hot oil tank 406 and enters the first radial compressor 408. The air is then compressed by the first radial compressor 408, exits the first radial compressor 408 and in step 7d enters a second radial compressor 410 for further compression. The number of radial compressors can be different and also the type of compressors may be different.

The air flow then goes in step 7e from the second radial compressor 410 to an energy storage unit, e.g., a Thermal Energy Store 412. The hot compressed air from the second radial compressor 410 is then cooled by the Thermal Energy Store 412. The heat energy is stored in the Thermal Energy Store 412 for future use and any water that is generated by the cooling process is drained off. The cooled compressed air is then sent to a Safety Cooler 414 in step 7f, where the air is further cooled prior to being sent in step 7g to a storage facility, e.g., cavern 416. This storage of the compressed air in the cavern 416 and the storage of the heat energy in the Thermal Energy Store 412 typically occurs during non-peak demand operation of the power generation system 402.

When the demand on the power generation system 402 increases to a desired point, energy output can be increased by releasing the stored compressed air back into the system to drive an expander 418, e.g., a turbine. For example, the cavern 416 releases some of the stored compressed air in step 7h which undergoes preheating at the insulated hot oil tank 406. The released compressed air then flows to the Thermal Energy Store 412 for heating in step 7i. Heat energy is transferred from the Thermal Energy Store 412 to the compressed air and the heated compressed air flows to a particle filter 420 in step 7j. The heated compressed air then flows in step 7k from the particle filter 420 to an expansion section of turbine 418. During expansion the air cools and undergoes a pressure drop while producing the work which drives the shaft 422 which in turn spins a portion of a generator 424 for generating power. After expansion the air flows from the turbine 418 to an air outlet 426 in step 7l, typically for release to atmosphere. Power generation system 402 can also include a shaft 428 for the compressors, a gear box 430 and a motor 432.

Figure 5:
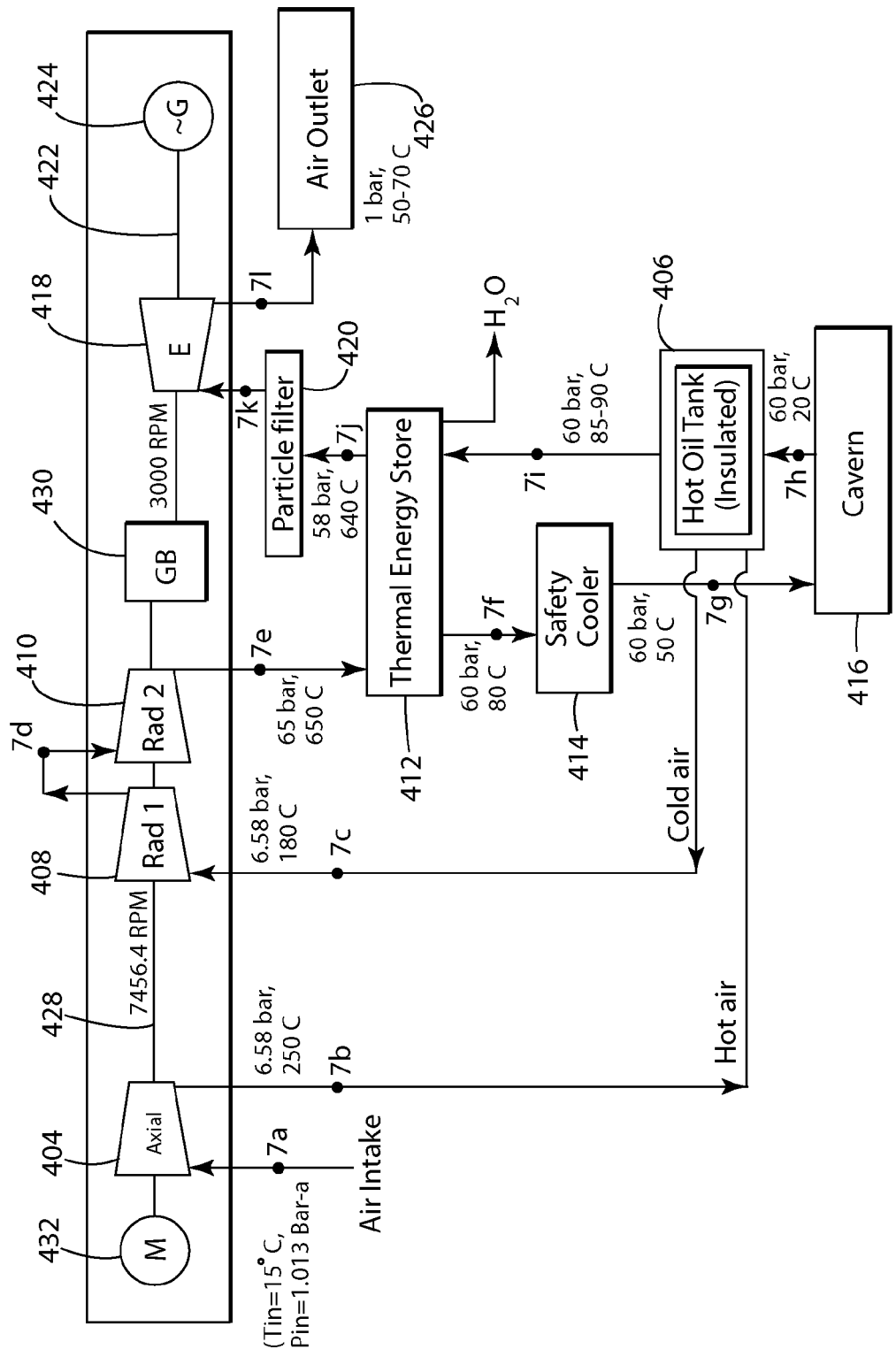
FIG. 5 shows the system of FIG. 4 with illustrative values according to exemplary embodiments.

According to an exemplary embodiment, an illustrative example with values of the pressures and temperatures of the air and oil at various points of the system shown in FIG. 4 is shown in FIG. 5. These values are exemplary and not intended to limit the embodiments. The system in FIG. 5 will operate as described above with respect to the system shown in FIG. 4 thus this description is omitted.

Figure 6:
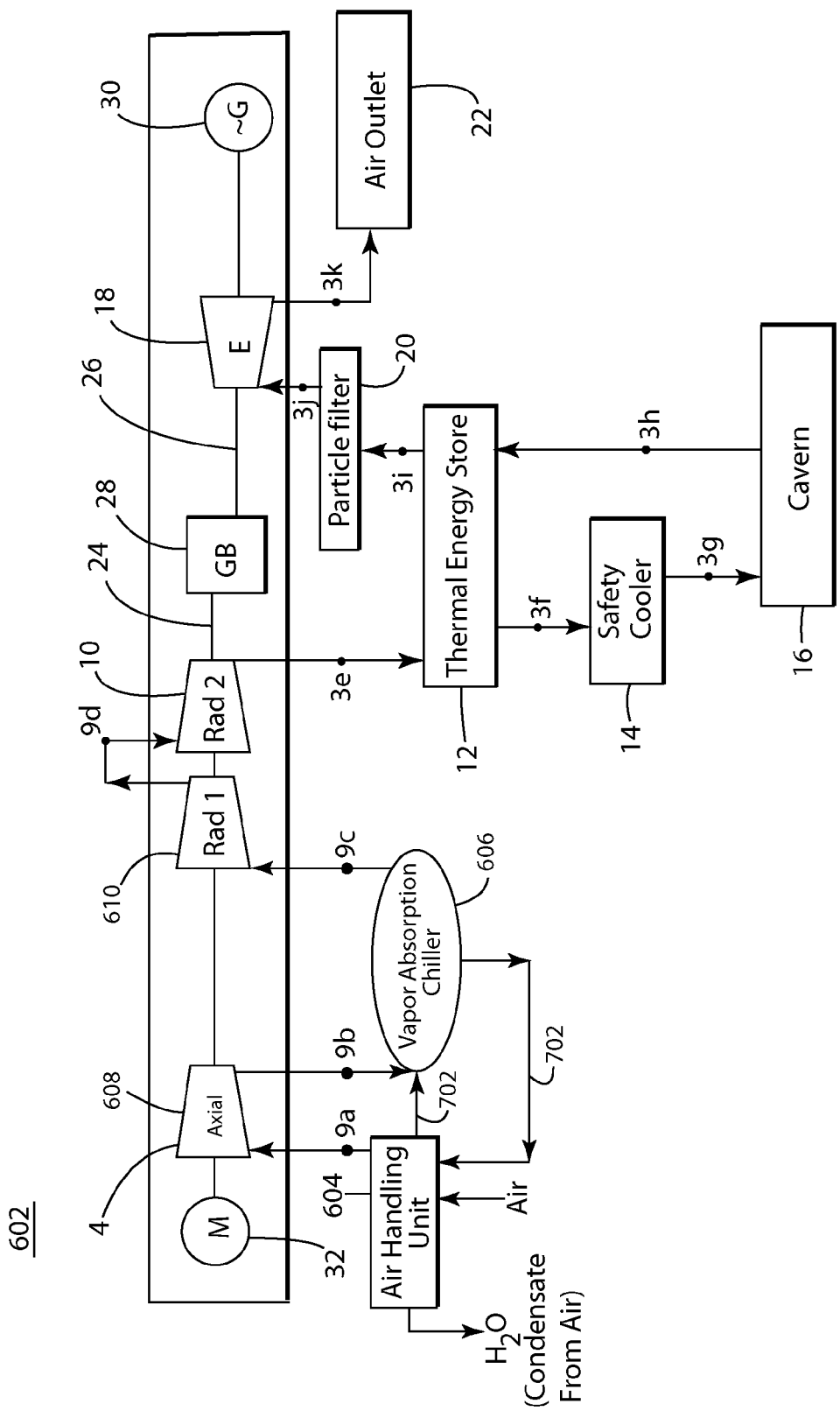
FIG. 6 illustrates an air cooling system in a power generation system according to exemplary embodiments.

According to another exemplary embodiment, an air handling unit 604 and a vapor absorption chiller 606 can be implemented in the beginning stages of a power generation system 602 as shown in FIG. 6. This allows the power generation system 602 to cool the air going into the axial compressor 608, remove moisture from this air (which in turn can reduce/remove the need for removing moisture from the air downstream at the Thermal Energy Store 12) and to reduce the temperature of the exhaust air from the axial compressor. This system will now be described by generally following the flow of air in the system up to the first radial compressor 610 followed by describing the fluid loops in the air handling unit 604 and the vapor absorption chiller 606. Initially in step 9a, air is brought into the air handling unit 604 and cooled, moisture is removed and the air is then taken into the axial compressor 608. The air is then compressed in the axial compressor 608, during which the air is put under pressure and undergoes an increase in temperature. This air is exhausted from the axial compressor 608 in step 9b, and undergoes heat exchange within a vapor absorption chiller 606. The cooled air flow then, in step 9c, departs the vapor absorption chiller 606 and enters the first radial compressor 610. The air is then compressed by the first radial compressor 610, exits the first radial compressor 610 and in step 9d enters a second radial compressor 10 for further compression. Elements 10-30 are similar to those shown in FIG. 1 thus their description is omitted.

Figure 7:
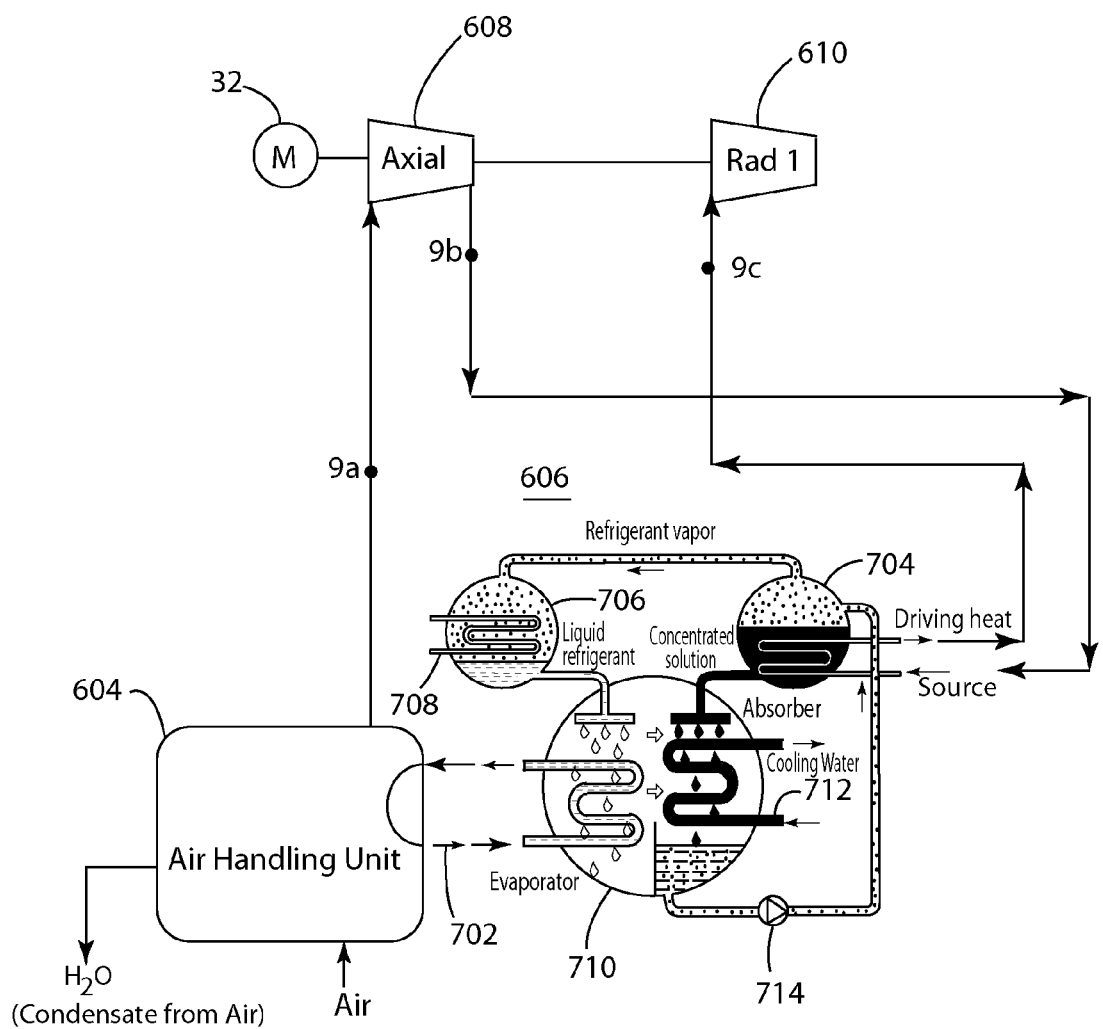
FIG. 7 illustrates an air handler and a vapor absorption chiller according to exemplary embodiments.

According to exemplary embodiments, the vapor absorption chiller 606 acts as a heat exchanger which in turn allows the exhaust air from the axial compressor 608 to be cooled to the desired temperature, as well as allowing the air handling unit 604 to cool the air prior to air entering the axial compressor 608 as will now be described with respect to FIG. 7. Initially, air enters the air handling unit 604 and is cooled by a cooling loop 702. Cooling loop 702 can include chilled water or a glycol solution. Additionally, moisture is removed from the air. This cooled air then goes to the axial compressor 608. The hot exhaust from the axial compressor 608 enters the vapor absorption chiller 606 and is cooled enroute to the first radial compressor 610 by exchanging heat with a refrigerant in a generation stage 704.

According to exemplary embodiments, the refrigerant vapor within the vapor absorption chiller 606 is evaporated during the generation stage 704 and flows to a condenser 706. The condenser 706 includes a heat exchanger 708 and outputs a liquid refrigerant which in turn cools the cooling loop 702 as shown in heat exchanger 710. This refrigerant is then cooled by cooling loop 712 and pumped back by pump 714 to the generation stage 704. Additionally, some portion of the refrigerant that remains in a liquid form from the generation stage 704 enters the heat exchanger 710 and is also cooled by the cooling loop 712 prior to being pumped back to the generation stage 704.

Figure 8:
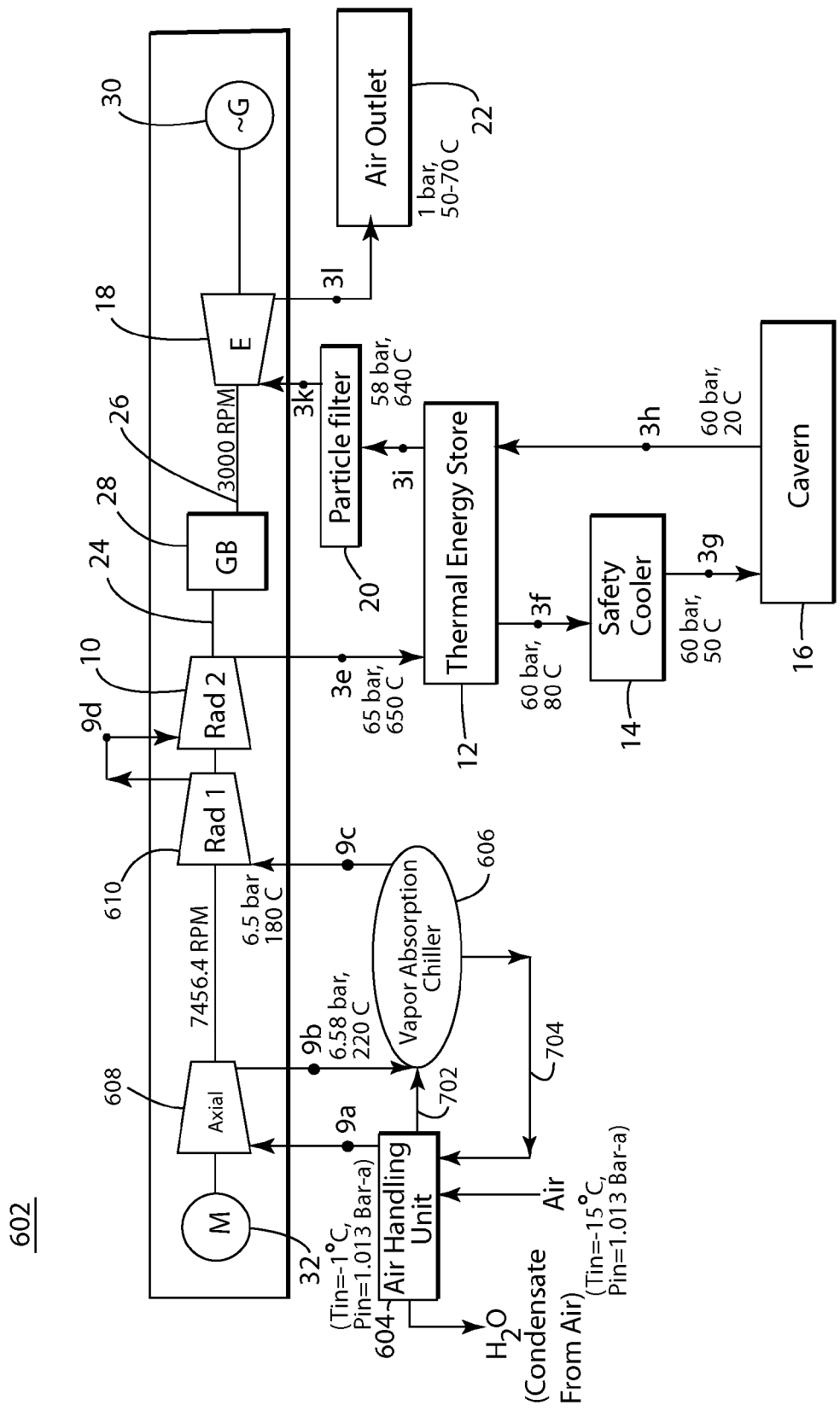
FIG. 8 shows the system of FIG. 6 with illustrative values according to exemplary embodiments.

According to an exemplary embodiment, an illustrative example with values of the pressures and temperatures of the air and oil at various points of the system shown in FIG. 6 is shown in FIG. 8. These values are exemplary and not intended to limit the embodiments. The system in FIG. 8 will operate as described above with respect to the system shown in FIG. 6 thus this description is omitted.

While the above described exemplary embodiments have shown three compressors in series and capturing the heat energy between the axial and the radial compressors, other exemplary variations exist. For example, other quantities and types of compressors could be used such as one axial and one radial compressor. Additionally, heat energy can be captured for future use from the exhaust of other compressors as desired.

Figure 9:
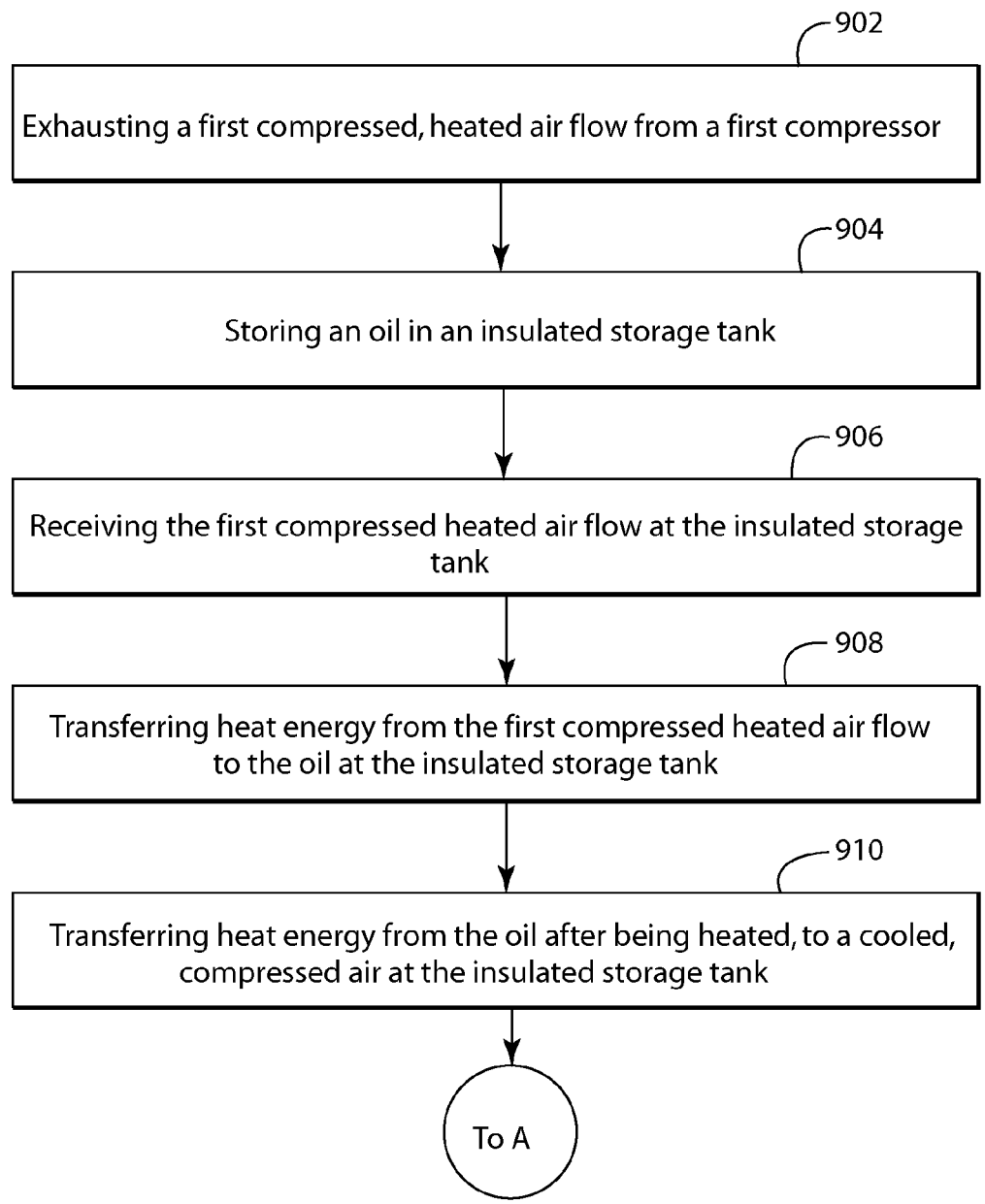
FIGS. 9 and 10 are flowcharts showing a method for capturing heat energy in a power generation system according to exemplary embodiments.
Figure 10:
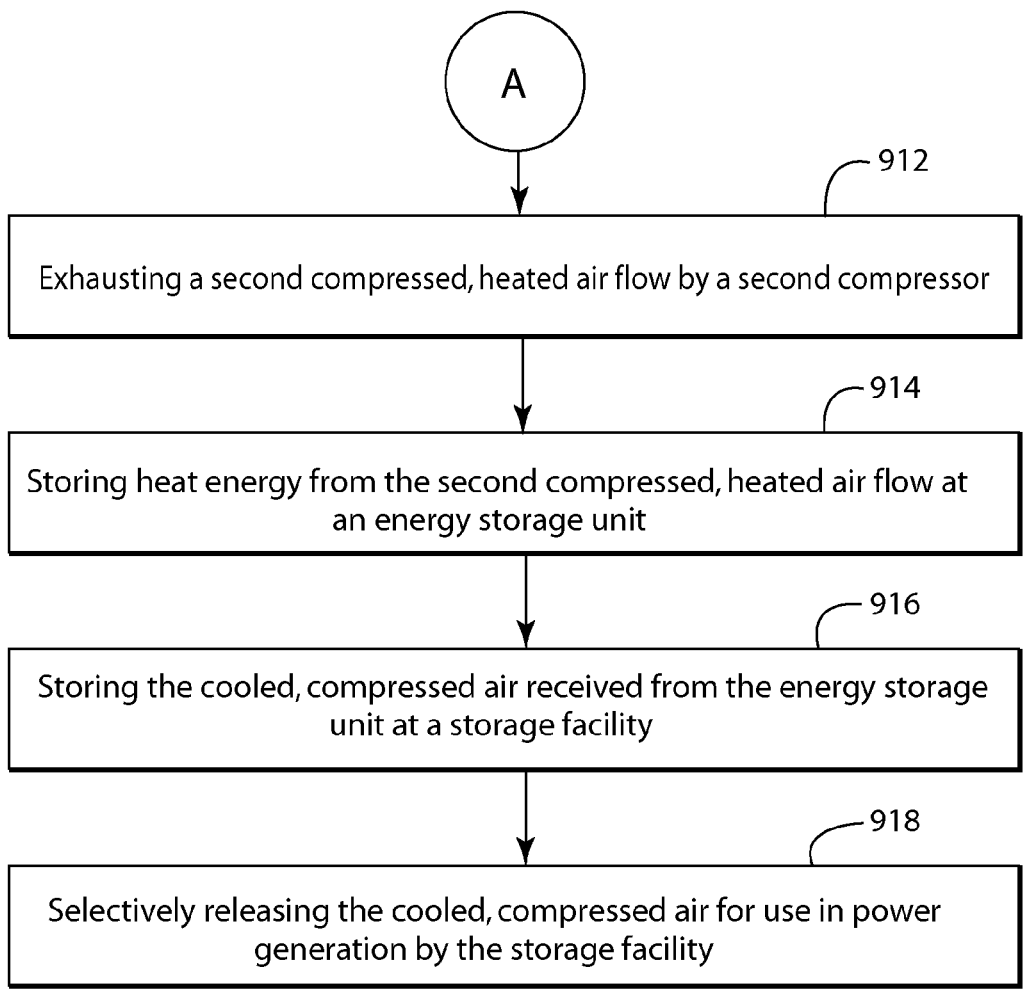

Utilizing the above-described exemplary systems according to exemplary embodiments, a method for capturing heat energy in a power generation system is shown in the flowchart of FIGS. 9 and 10. The method includes: a step 902 of exhausting a first compressed, heated air flow from a first compressor; a step 904 of storing an oil in an insulated storage tank; a step 906 of receiving the first compressed heated air flow at the insulated storage tank; a step 908 of transferring heat energy from the first compressed heated air flow to the oil at the insulated storage tank; a step 910 of transferring heat energy from the oil after being heated, to a cooled, compressed air at the insulated storage tank; a step 912 of exhausting a second compressed, heated air flow by a second compressor; a step 914 of storing heat energy from the second compressed, heated air flow at an energy storage unit; a step 916 of storing the cooled, compressed air received from the energy storage unit at a storage facility; and a step 918 of selectively releasing the cooled, compressed air for use in power generation by the storage facility.

Utilizing the above-described exemplary systems according to exemplary embodiments, a method for cooling air in a power generation system is shown in the flowchart of FIG. 11. The method includes: a step 1102 of receiving air at an air handling unit; a step 1104 of cooling the air at the air handling unit to obtain a cooled air; a step 1106 of removing moisture from the cooled air at the air handling unit to obtain a cooled, dry air; a step 1108 of compressing air by a first compressor; a step 1110 of exhausting a first compressed, heated air flow from the first compressor; a step 1112 of transferring heat energy between a plurality of mediums including the compressed, heated air at a vapor absorption chiller; a step 1114 of cooling the first compressed, heated air flow at the vapor absorption chiller; a step 1116 of compressing the cooled first compressed, heated air flow at a second compressor; and a step 1118 of exhausting a second compressed, heated air flow from the second compressor.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system for capturing heat energy in a power generation system, the system comprising:
    a first compressor configured to exhaust a first compressed, heated air flow;
    a heat exchanger connected to the first compressor and configured to receive the first compressed, heated air flow and configured to transfer heat energy from the first compressed, heated air flow to an oil;
    at least one pump connected to the heat exchanger and configured to pump the heated oil in a closed-loop system from the heat exchanger to an insulated storage tank;
    a second compressor connected to the heat exchanger and configured to exhaust a second compressed, heated air flow;
    an energy storage unit connected to the second compressor and configured to store heat energy from the second compressed, heated air flow;
    a storage facility connected to the energy storage unit and configured to store a cooled, compressed air received from the energy storage unit and configured to selectively release the cooled, compressed air back into the power generation system; and
    an insulated storage tank fluidly connected to the at least on pump configured to store the heated oil and configured to transfer heat energy from the heated oil to the cooled, compressed air.

2. The system of claim 1, wherein the storage facility is a cavern.

3. The system of claim 1, wherein the closed-loop system for the oil is connected to the insulated storage tank.

4. The system of claim 1, further comprising:
    a hot oil pump fluidly connected to the heat exchanger and configured to pump hot oil to the insulated storage tank;
    a cold oil pump fluidly connected to the insulated storage tank and configured to pump cool oil to a cold oil tank; and
    the cold oil tank fluidly connected to the cold oil pump and configured to contain the cool oil.

5. The system of claim 1, wherein the cooled, compressed air is stored in the storage facility when the power generation system is operating during non-peak demand hours.

6. The system of claim 1, further comprising:
    an expander connected to the energy storage unit and configured to expand the air flow which drives a shaft and configured to exhaust a cooler, lower pressure air flow.

7. The system of claim 6, further comprising:
    an air outlet fluidly connected to the expander and configured to exhaust the cooler, lower pressure air flow to atmosphere.

8. The system of claim 1, wherein the energy storage unit is also configured to receive a pre-heated, compressed air from the insulated storage tank and to heat the pre-heated, compressed air for use in a turbine.

9. A system for capturing heat energy in a power generation system, the system comprising:
    a first compressor configured to exhaust a first compressed, heated air flow;
    an insulated storage tank connected to the first compressor and configured to store an oil, to receive the first compressed, heated air flow, to transfer heat energy from the first compressed heated air flow to the oil and to transfer heat energy from the oil after being heated to a cooled, compressed air flow;
    a second compressor connected to the insulated storage tank and configured to exhaust a second compressed, heated air flow;
    an energy storage unit connected to the second compressor and configured to store heat energy from the second compressed, heated air flow; and a storage facility connected to the energy storage unit and configured to store the cooled, compressed air received from the energy storage unit and configured to selectively release the cooled, compressed air back into the power generation system.

10. The system of claim 9, wherein the storage facility is a cavern.

11. The system of claim 9, wherein the cooled, compressed air is stored in the storage facility when the power generation system is operating during non-peak demand hours.

12. The system of claim 9, further comprising:
an expander connected to the energy storage unit and configured to expand the air flow which drives a shaft and configured to exhaust a cooler, lower pressure air flow.

13. The system of claim 12, further comprising:
an air outlet fluidly connected to the expander and configured to exhaust the cooler, lower pressure air flow to atmosphere.

14. The system of claim 10, wherein the energy storage unit is also configured to receive a pre-heated, compressed air from the insulated storage tank and to heat the pre-heated, compressed air for use in a turbine.

15. A method for capturing heat energy in a power generation system, the method comprising:
exhausting a first compressed, heated air flow from a first compressor;
storing an oil in an insulated storage tank;
receiving the first compressed heated air flow at the insulated storage tank;
transferring heat energy from the first compressed, heated air flow to the oil at the insulated storage tank;
transferring heat energy from the oil after being heated, to a cooled, compressed air at the insulated storage tank;
exhausting a second compressed, heated air flow by a second compressor;
storing heat energy from the second compressed, heated air flow at an energy storage unit;
storing the cooled, compressed air received from the energy storage unit at a storage facility; and
selectively releasing the cooled, compressed air for use in power generation by the storage facility.

16. The method of claim 15, wherein the storage facility is a cavern.

17. The method of claim 15, further comprising:
storing the cooled, compressed air in the storage facility when the power generation system is operating during non-peak demand hours.

18. The method of claim 15, further comprising:
expanding, at an expander, the air flow which drives a shaft and configured to exhaust a cooler, lower pressure air flow.

19. The method of claim 18, further comprising:
exhausting the cooler, lower pressure air flow received from the expander to atmosphere by an air outlet.

20. The method of claim 15, further comprising:
receiving at the energy storage unit a pre-heated, compressed air from the insulated storage tank and heating the pre-heated, compressed air for use in a turbine.

* * * * *